United States Patent [19]

Holladay

[11] 4,185,304
[45] Jan. 22, 1980

[54] ELECTRONIC HALFTONE SCREENING

[75] Inventor: Thomas M. Holladay, Webster, N.Y.

[73] Assignee: Xerox Corporation, Stamford, Conn.

[21] Appl. No.: 813,559

[22] Filed: Jul. 7, 1977

[51] Int. Cl.² ............................................. H04N 1/22
[52] U.S. Cl. .................................. 358/298; 358/283
[58] Field of Search .............. 358/298, 283, 296, 297, 358/302, 75, 78

[56] References Cited

U.S. PATENT DOCUMENTS

| 3,961,132 | 6/1976 | Landsman | 358/283 |
| 4,012,584 | 3/1977 | Gascoigne | 358/302 |
| 4,032,978 | 6/1977 | Wong | 358/283 |
| 4,051,536 | 9/1977 | Roetling | 358/302 |

*Primary Examiner*—Bernard Konick
*Assistant Examiner*—Alan Faber
*Attorney, Agent, or Firm*—Michael H. Shanahan

[57] ABSTRACT

An electronic signal representing the density of pixels in a scanned line in an original image and containing pixels in whole number multiples of a single line of halftone screen partial dot values plus a predetermined extension parameter is electronically halftoned by comparing the pictorial signal with the single line of halftone screen partial dot values to form an electronic halftone image. An electronic screen function represented by the single line of halftone screen values, produces automatically a rotated halftone screen at a predetermined angle to the original electronic image when the number of pixels in the input, scanned line of the original document is set equal to a whole number multiple of the number of partial-dot values plus a predetermined extension parameter. Under these conditions, the scanned input is automatically halftone screened electronically into halftone cells approximating a parallelogram and having said predetermined angle. The single line of partial-dot values need only be circularly buffered through a comparator. No electronic indexing or shifting of partial-dot values is required.

18 Claims, 9 Drawing Figures

FIG. 2

ELECTRONIC HALFTONE SCREENING

BACKGROUND OF THE INVENTION

This invention relates generally to image reproduction by electronic halftoning; and more particularly relates to such a system including a technique for producing halftone screens at variable angles with minimum memory requirements.

The process of reproducing a continuous toned image by a halftone representation is well known in the art. Generally, areas in the original continuous toned image are approximated by dots of differing sizes where the gradation in dot sizes of the reproduction is dependent on the gray scale level in the area of the original. For very low density values in the original, small dots are used and for darker areas, a larger dot size is provided. These areas of different sizes of dots, when viewed from a distance, appear to represent a continuous tone image because of the integration by the human eye. Therefore, the dot area or halftone cells are necessarily small in order to create a continuous tone illusion.

Such halftoning processes typically utilize optical screening techniques to produce the halftone cells. A screen having opaque rulings separating transmissive halftone cells were normally added optically to an image in order to form a resulting halftoned image. The optical halftone screen adds or multiplies the image, cell by cell, by its transmittance function. The combined image is then thresholded onto an imaging member, such as a photographic film to produce the halftoned image having areas of differing dot size. The size and shape of the halftone cell forming the final image is dependent upon the screen used and differing optical effects that are apparent in the final image can be modified by choosing the screen carefully.

With the advent of video scanning and electronic representation of an image came the idea of electronic halftoning. If an image can be generated electronically as a video signal, then one should be able to generate an "electronic screen" or a signal representative of such to combine with the image signal. The combined signal, if thresholded against a reference similar to the photographic technique, would then be an electronic halftone image that could be outputted to a recording medium by a transducer. The electronic halftoning systems in the prior art have represented both analog techniques and digital procedures. However, the storage and combination of the screen functions in the previous systems have been generally inefficient and relatively expensive. With the resolution of a final image being dependent upon the number of pixels scanned, prohibitive amounts of time and memory have had to be used to provide a quality reproduced image. Furthermore, and particularly in the digital electronic halftoning area, prior techniques fail to teach a simplified method for generating an electronic halftone screen at non-orthogonal angles. With variable angle screens, it is possible to change the texture and final appearance of an image. Certain screen angles are more pleasing to the eye and combination screens at multiple angles can be used to create effects not presently avaiable. Further, color reproductions usually require screens at various angles so that Moire patterns are not seen in the final image.

In one prior technique of electronic halftoning, a simulation of the photographic process is achieved by individually turning on or off a large number of sub-cells from which is generated the electronic halftone cell or dot. A separate sample of the original image to be reproduced, a "pixel", is utilized in making a decision as to whether to turn on or off each sub-dot element, in the whole dot. In this method, there is combined typically by addition, a halftone screen function unrelated to original image intensity information with the electronic signal corresponding to the image information. This combined signal is then compared with a fixed threshold to determine how many partial dots within the halftone cell to turn on. Typically, levels above threshold are made white in the reproduction and levels below threshold are made black, although this is arbitrary and reverse may be true. Hence, the continuous tone original image becomes a binary image suitable for printing, display or viewing. In a digital implementation, signals for the screen and picture functions are sampled. Typically, there are twenty to thirty-two samples within the area corresponding to one period of the two dimensional screen function. Halftone dots of various sizes represent the gray levels.

Improvements over the usual technique are described by Klensch, R. J., "Electronically Generated Halftone Pictures", *RCA Review*, September, 1970 and Bayer, B. E., "An Optimum Method For Two-Level Rendition of Continuous-Tone Pictures", *IEEE International Conference On Communications*, Vol. 1, 1973.

The utilization of a rotated screen in other than a photographic system has previously been limited usually to zero degrees, or forty-five degrees. Forty-five degree screens are invariably based on patterns similar to those disclosed by B. E. Bayer, "An Optimum Method For Two-Level Rendition Of Continuous-Tone Pictures", *International Conference On Communications*, Conference Record, page 26-11 (1973) or B. Lipel and M. Kurland, "The Effects of Dither on Luminance Quantization Of Pictures", *IEEE Transactions On Communication Technology*, 6, page 879 (1971). A notable example can be found in C. N. Judice, et al, "Using Ordered Dither To Displace Continuous Tone Pictures On An AC Plasma Panel", *Proceeding Of The S.I.D.*, Vol. 15/4, Fourth Quarter, 1974.

Digital electronic halftoning employs, in general, horizontal and vertical screen angles. Examples of these are found in "XCRIBL—A Hard Copy Scan Line Graphics System For Document Generation", R. Reddy et al, *Information Processing Letters* (Netherlands), Vol. 1, No. 6, page 246 (1972). Analog systems have typically been limited to zero degree and/or forty-five degree screens. Typical analog systems are disclosed in R. J. Klensch et al, "Electronically Generated Halftone Pictures", Proceedings TAGA, page 302, 1970 and in R. L. Hallows et al, "Electronic Halftones", *IEEE Spectrum*, page 64, (October, 1968).

In new areas of technology it is often times desirable to provide improvements in systems which provide increased efficiency, greater capability and more variety than is presently obtainable. The present invention is such an improvement in that storage requirements for electronic half screening is reduced drastically; a great variety of halftone screen angles are permitted; and greater resolution is provided through the use of partial-dots or sub-dots within each halftone dot or cell.

SUMMARY OF THE INVENTION

It is, therefore, an object of the present invention to provide an apparatus and method useful in producing electronic halftone screens at various angles with respect to a scanned original image.

It is another object of the present invention to permit efficient storage of a halftone cell function used to generate screens at various angles.

Still another object of the invention is to provide an apparatus and method useful in producing electronic halftone screens at multiple angles.

A further object of the invention is to provide an apparatus and method useful in producing electronic halftone screens at non-perpendicular angles.

Yet, a still further object of the present invention is to provide an efficient method of electronically halftoning an image serially scanned in digital or analog applications.

The aforementioned objects and advantages, and others, are realized in accordance with the practice of the present invention by circularly buffering a single line of partial-dot values representative of a predetermined halftone cell approximating a parallelogram; generating a pictorial signal representing the density of a continuous tone image and having in each line of input scan a number of pixels equal to a whole number multiple of the number of partial-dot values in the single line of partial-dot values plus a predetermined parameter; and comparing the pictorial signal with said circularly buffered single line of partial-dot values.

BRIEF DESCRIPTION OF THE DRAWINGS

For a better understanding of the invention as well as other objects and further features thereof, reference is made to the following detailed disclosure of the preferred embodiments of the invention taken in conjunction with the accompanying drawings thereof, wherein:

FIG. 1A is a schematic illustration of an individual halftone cell of the angle shown in FIG. 1 with the subelements or small squares of the cell representing the partial dots of the screen.

FIG. 1B is a table of parameters as defined by the instant invention for the specific screen shown in FIG. 1.

FIG. 2 is a tabulation of an example of the operation of the invention to halftone an original image to provide the halftone cell of FIG. 1.

DESCRIPTION OF THE PREFERRED EMBODIMENTS

Figure 1:
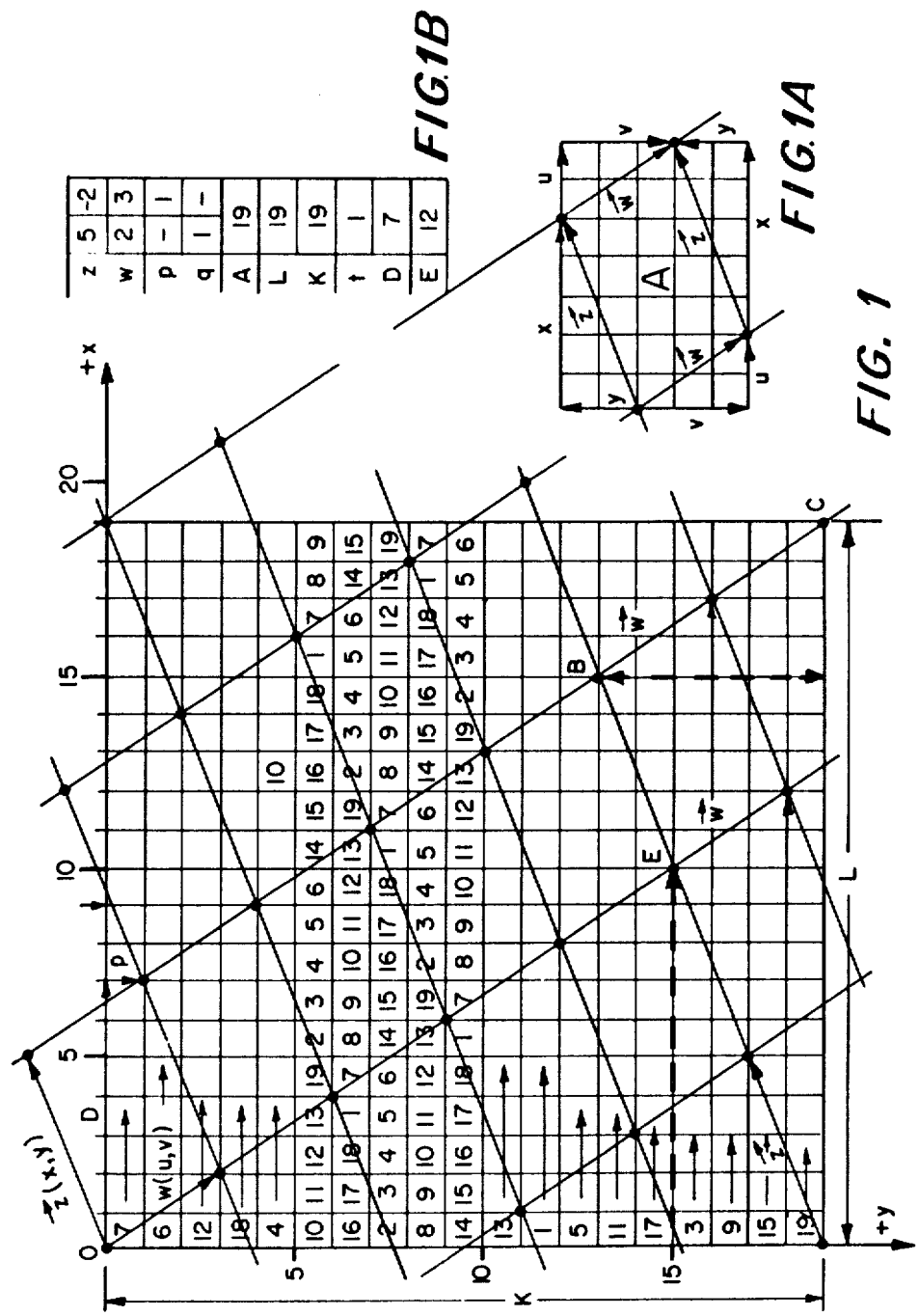
FIG. 1 is a schematic illustration of a halftone screen comprising halftone cells, together with pertinent descriptors which define the halftone cells within the halftone screens.

Conversion of certain Halftone Cells Approximating a Parallelogram Into Single Line of Partial-Dot Values To see how such an angled screen can be produced and how the pertinent descriptors are calculated, consider the creation of a halftone screen in the manner of FIG. 1. The unit cell is visualized as a piece of a puzzle, where the pieces can be laid side by side to cover all space. In assembling these pieces it will be found that the area inside the cell will approximate the area of a parallelogram which is described by the two vectors $\vec{Z} = \vec{Z}(x,y)$ and $\vec{W} = \vec{W}(u,v)$. For convenience, FIG. 1 has a left-handed coordinate system with the origin in the top left corner. This corresponds to the general positioning of most output images. Positive "x" is horizontal and to the right and positive "y" is vertical and down.

An individual halftone cell is considered to be composed of a number of subelements which can be individually blackened to produce one of the shades of grey from none to all black. In FIG. 1, the halftone cell is outlined above the point B and has 19 subelements for a total of 20 different possible grey levels represented by this halftone dot. The subelements are numbered 1 through 19.

At the right of FIG. 1A, a parallelogram with the area of the halftone cell (A) is inscribed in a rectangle in which the corresponding X and Y components of the two vectors $\vec{Z} = \vec{Z}(x,y)$, and $\vec{W} = \vec{W}(u,v)$ are shown. The area of the halftone cell (A) is the magnitude of the cross product of the two vectors Z and W in which the components of the vectors, x,y,u, and v are signed quantities. For the coordinate system shown in FIG. 1 all of the components of $\vec{Z}$ and $\vec{W}$ except y are positive. The area inside one halftone cell is thus easily shown with this coordinate system chosen to be $$A = x^*v - u^*y \quad (\text{*, a symbol for multipliation}) \qquad \text{Eq. 1}$$

This will be seen to be the sum of the product of the x component of the $\vec{Z}$ vector with the y component of the $\vec{W}$ vector and the corresponding reverses. This is valid because the y component of the $\vec{Z}$ vector as drawn will be negative.

Such a set of vectors will repeat along the X axis. If L is the distance along the X axis in which this parallelogram will recur, then clearly from triangle ABC in FIG. 1, this condition is satisfied when $$k * \vec{Z} + j * \vec{W} = L \qquad \text{Eq. 2}$$

Where k, j ≧ 0 are the smallest integer values to be solved to satisfy the equation. The vector Eq. 2 can be separated into two equations along the two coordinate axis to give In X direction: $k^*x + j^*u = L$ \qquad Eq. 3

In Y direction: $-k^*y = j^*v$ \qquad Eq. 4

If p is defined as the greatest common divisor (regardless of sign) of the two components y and v then Eq. 4 can be rewritten as $$-y/j = v/k = p = GCD(y,v) \geq 1 \qquad \text{Eq. 5}$$

Combining Eq. 5 with Eq. 3 and using the definition of Area from Eq. 1 gives $$A = L*p \qquad \text{Eq. 6}$$

Since A and p can be calculated from the components of the vectors for $\vec{Z}$ and $\vec{W}$ this means L can be calculated. A similar set of conditions can be obtained to find the repeat length in the Y axis, K. In triangle AEO we must have $$m*\vec{W} - n*\vec{Z} = \vec{K} \qquad \text{Eq. 7}$$

where m,n >0 are integers which satisfy the equation and as before Eq. 7 can be separated into X and Y components to yield $$m*v + n*y = K \qquad \text{Eq. 8}$$

$$m*u = n*x \qquad \text{Eq. 9}$$

If an integer q is defined as the largest common divisor of the X components of the Z and W vectors which create the halftone cell, then Eq. 9 can be written as $$u/n = x/m = q = GCD(x,u) \geq 1 \qquad \text{Eq. 10}$$

Combining Eq. 10 with Eq. 8 and using the definition of the area of the unit cell, A, from Eq. 1, gives $$A = K*q \qquad \text{Eq. 11}$$

and again K can be obtained because A and q can be calculated from the components of the $\vec{Z}$ and $\vec{W}$ vectors which characterize the unit halftone cell.

One interpretation of Eqs. 6 and 11 is that a number of the original halftone cells, each approximating a parallelogram, can be combined to form a large rectangular block of many halftone cells of dimension L by K which will cover all spaces if laid end-to-end.

This is precisely the type of representation required for fast indexing purposes for serial halftoning techniques.

A closer look at Eq. 6 moreover, shows that the total area (A) involved in a parallelogram (i.e. a halftone cell) is consumed in a rectangle L by p. Because p will not, in general, equal K (see Eq. 11) the area must be repeated again for a number of times until the areas cover the space inside the L by K rectangle. Thus, the area must repeat itself again in a distance p in the y direction but must be displaced from the origin by a distance D such that the halftone cell which was at the origin at starting has moved to the next location in the +y direction. The number of displacements to cover the L by K rectangle are clearly the number of intersection points inside the L by K rectangle when it is recalled that the four corners are each only one-quarter inside the whole cell. It is obvious from Eqs. 6 and 11 that the number of repetitions in the y direction is the GCD (L,K), i.e. L=p * GCD (L,K). From a graphical view point (see FIG. 1) the movement from the same position in one halftone cell to the next cell, can be accomplished by following along either the sides of the halftone cells (i.e. integer multiples of $\vec{Z}$ and $\vec{W}$) or in a horizontal (i.e. D) and vertical (i.e. p) directions (discussed later). Since the distance between halftone cells is the same in both of these paths their vector sums are equal.

Mathematically, this repeat distance is satisfied if (see FIG. 1).

$$\vec{D} + \vec{p} = r*\vec{W} + t*\vec{Z} \qquad \text{Eq. 12}$$

where r, t ≥ 0 are integers to be determined and a constraint exists on the value of D.

$$0 < |D| \leq L \qquad \text{Eq. 13}$$

writing the X and Y components of Eq. 12 gives $$r*u + T*x = D \qquad \text{Eq. 14}$$

$$r*v + t*y = p \qquad \text{Eq. 15}$$

"p" is equal to "1" for halftone cells which are represented by a screen function of a single line of partial-dot values. Eqs. 13-15 are a set of three equations for determining r,t,D.

Eqs. 14-15 are a set of simultaneous equations which can be solved for the integers r and t to yield $$r = (p*x - D*y)/A \qquad \text{Eq. 16}$$

$$t = (D*v - u*p)/A \qquad \text{Eq. 17}$$

Solving Eq. 17 for D gives $$D = (t*A + p*u)/v \qquad \text{Eq. 18}$$

$$0 < D \leq L.$$

In Eq. 18, t ≥ 0 is an integer which must be determined so that D satisfies Eq. 13. The other parameters are known quantities. Successive displacements of the amount D in the X direction and p in the Y direction will translate the original partial dot of the halftone cell to the next corresponding position in the +Y direction. If the parameter D is thus chosen from Eq. 18, then it provides the correct angle on the halftone screen.

The Extension Parameter

For indexing purposes and because of the coordinate axis chosen, it is convenient to define an extension parameter E defined by $$E = L - D \qquad \text{Eq. 19}$$

The purpose of the extension parameter will be made apparent.

Defining The Single Line of Partial Dot Values By Two Parameters

Thus, the required halftone cells can be replicated at any angle by knowing two parameters, such as L, and E. It is most convenient to use two parameters NLEV, and E. NLEV is the total number of partial dots in the halftone cell. The extension parameter, E, gives the starting address of the next element block a distance "one" in the +Y direction, which will create the rectangular repeat block L * K upon circular buffering of the partial-dot values.

For clarification this technique will be applied to FIG. 1. Consider FIG. 1 and examine the column of parameters on the right which describe the particular halftone dot under consideration. The dot is characterized by the two vectors Z=(5,−2) and W=(2,3). The greatest common divisor of the Y and X components of these two vectors give respectively p=1, q=1, from Eqs. 5 and 10. The total area of the halftone cell from Eq. 1 is clearly A=(5) * (3)−(2) * (−2)=19 and from Eqs. 6 and 11, L=k=19. From Eq. 18 it is easy to show that t=1 and D=7 and thus from Eq. 19 the extension parameter E=19−7=12.

With an array of numbers 19 values long, the halftone screen with the desired angles depicted in FIG. 1 can be generated by creating the next tow of values down in Y (i.e. p=1, in a +Y direction) by sliding the previous line circularly in a negative direction a distance of E=12.

Description of Halftone Screen Elements

The halftone screen function depicted in FIG. 1 indicates that a halftone cell or halftone dot approximating a parallelogram in shape can be represented by a single line of subelement or partial-dot values which are shifted relative to the input scan. For the purposes of clarity of description, the halftone dots are herein referred to as halftone cells in order to avoid confusion with the subelements of the halftone dots which are herein referred to as partial dots. For the sake of convenience, in referring to FIG. 1, the halftone cell shown to the right of the K*L block is shown to consist of nineteen partial dots. The numbers 1-19 refer to positions of the partial dots within the halftone cell. In the halftone reproduction of the original image to be copied, each of the partial dot positions numbered 1-19 is either occupied by marking material, such as ink, or left blank depending upon the density of the original image at a location thereon corresponding to the location of the partial dot position within the halftone cell.

In this regard, the present invention provides greater resolution and greater detail in the halftone reproduction than prior techniques. In prior techniques, an average gray scale value of a portion of the original image to be reproduced which corresponds to the halftone dot position on the halftone reproduction is obtained and thresholded against all of the halftone partial dots so as to cause the halftone dot area of the halftone reproduction to be either occupied by marking material of left blank. It is apparent that in prior techniques, the resolution and sensitivity to detail in the original image is quite attenuated.

In accordance with the present invention, with nineteen partial dot positions within the halftone cell, for example, the original document intensity range detectable by the read scanner can be divided into twenty ranges (19 separate values plus no levels), each of which can be allocated to a partial dot position in the halftone cell. For example, if the read scanner provides a digital output of 8 bits per pixel of original document, then there will be 256 intensity values detectable by the read scanner and which can be allocated to the partial dot positions in the halftone cell. For the nineteen partial dots in the halftone cell of FIG. 1; each partial dot could be separated from the previous dot by 13 intensity levels (i.e. 256/19=13). The partial dot intensity value allocation can then be compared with the intensity value of the scanned original document pixel and appropriate circuitry provided to either cause occupation of the partial dot position in the output image to occur with marking material or cause that partial dot position to be left blank. It will be appreciated that these two signals can be combined in a number of ways; either added, multiplied, divided, subtracted with respect to one another and then thesholded; or can be directly compared to one another; either digitally or in any analog manner.

By storing and utilizing a halftone screen function in a single line of partial-dot values and adjusting the number of pixels in the input scan as previously mentioned, the present invention provides another great advantage over prior techniques which attempt to provide partial dot halftone cells. These prior techniques, generally speaking, must store original document or output scan lines intensity value allocations plus each partial dot value for each halftone cell together with information on the position of each cell. This requires a vast amount of data storage and handling, resulting in the consumption of time. On the other hand, the present invention, with its single line of partial dot values consumes much less time in that the single line can be continuously circularly buffered. No time delay is encountered in the present invention.

In this connection, it is to be understood that the K*L blocks in FIG. 1 does not represent the whole screen function, but rather represents a basic block containing the minimum repeats in the x and y directions. A whole screen function contains a plurality of identical K*L blocks. This point should be kept in mind in order to appreciate the elegant simplicity of the present invention.

Generally speaking, in scanning an original document and outputting a reproduction, it is conventional to scan across the entire width of the original and reproduced documents before indexing down to the next line. Accordingly, it will be appreciated that if the partial dot values are repeated in the indicated sequence continually and if the whole number multiple of pixels in the input scan is observed, then, the next scan line is automatically provided with the desired relationship between the scanned, input signal and the single line of partial-dot values. Thus, the output scanner can literally zip across the width of the halftone reproduction without time delays inherent in prior techniques. By conversion of angular screens into single line screen functions, the single line screen function can be used to provide automatic indexing with a concurrent reduction in the amount of information needed to be stored and manipulated. This provides orders of magnitude improvement over prior techniques which store a whole electronic halftone screen function and buffer several output scan lines of image and then compare the image pixel by pixel to each of the halftone cells or even partial dots of the stored halftone screen function.

Description of Operation of Single Line Partial Dot Values Relative to Scan Input Referring now, briefly, to FIG. 1, it can be seen that a single line of 19 partial-dot positions can be arranged in sequence such that the halftone cell of 19 dots is replicated by a shifting, generation of the partial-dot positions in the "y" direction. For example, if one looks at the sequence of numbers beginning in the "x" direction, beginning with "16" and ending with "15" (the seventh line down in the K*L block) one will appreciate that by shifting this sequence of numbers over by twelve positions, a new address is found for the next line down in the "y" direction and the iteration of this shifting will cause a complete replication of the nineteen partial-dots positions within each halftone cell throughout the entire K*L block. The K*L block represents the smallest common arrangement of partial-dot values which define a plurality of halftone cells. An entire halftone reproduction contains many K*L blocks. Furthermore, it will be appreciated that the K*L block is of interest primarily in analyzing a halftone cell which approximates a parallelogram and reducing the halftone screen to its lowest common element. The lowest common element in the halftone screen, on the other hand, is simply the halftone cell, itself. Thus, any of the sequences of numbers in the "x" direction taken together with an extension parameter defines the halftone cell.

The present invention, realizes that for certain halftone cells which approximate a parallelogram, such as that depicted in FIG. 1, a single line of partial-dot values can be utilized to generate an entire screen function in providing a halftone reproduction of a scanned original image. Furthermore, the present invention eliminates the necessity for electronically manipulating a shifting parameter (as in my copending application Ser. No. 813,599 filed concurrently herewith and now U.S. Pat. No. 4,149,194 to effect the screen function by adjusting the number of pixels in the input scan to equal a whole number multiple of the number of partial-dots in the halftone cell plus the extension parameter.

Figure 2:
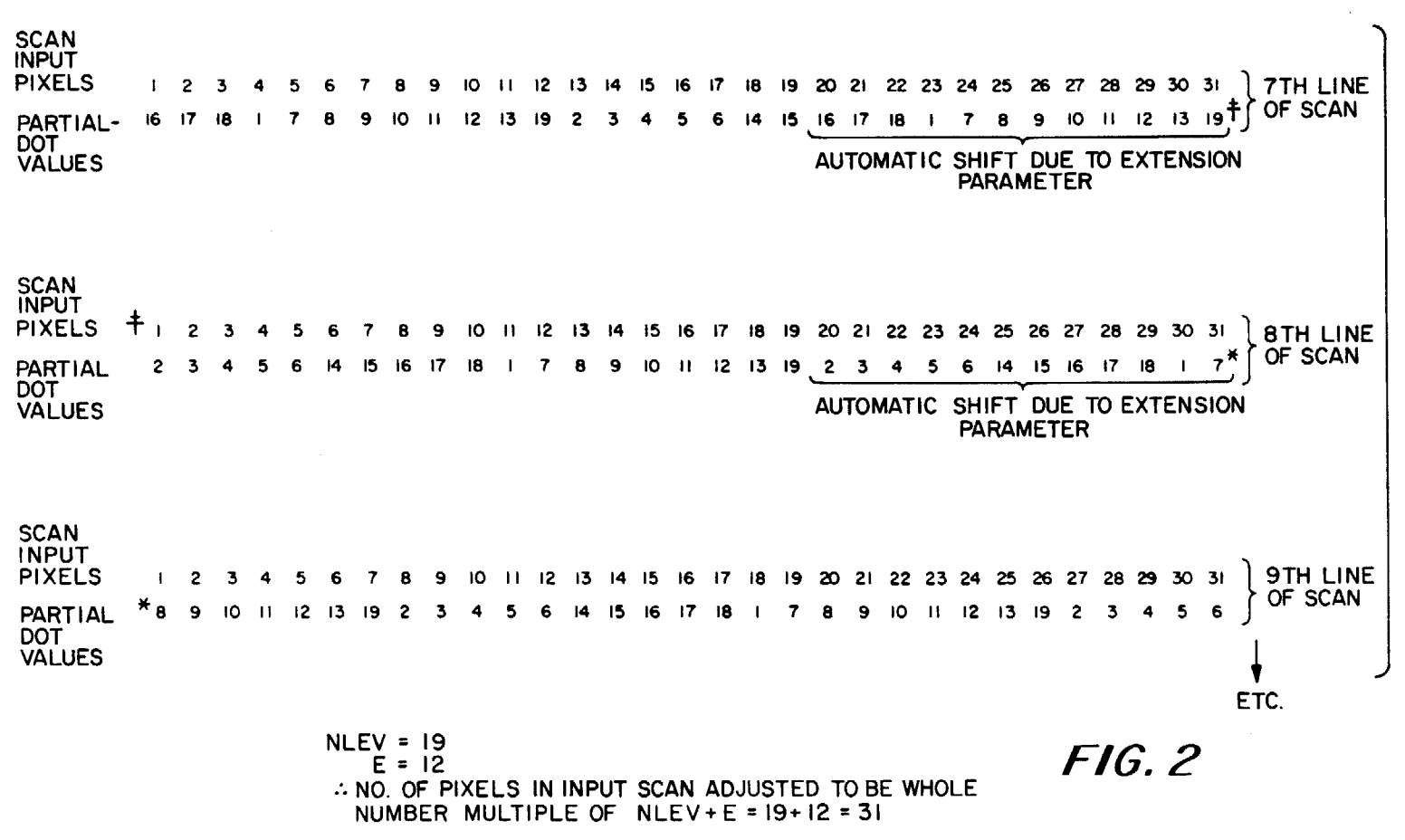

This can be more readily appreciated by considering FIG. 2 wherein the pixels in the input scan lines are shown in timed relationship to the partial-dot values or positions. As indicated above, and in FIG. 2, the number of partial-dots in the cell of FIG. 1 is nineteen the extension parameter is twelve; and, therefore, the smallest whole number multiple of the cell plus its extension parameter is equal to thirty-one. It will be appreciated, of course, that the number of pixels in an actual scan line can be thousands; but, it will be further appreciated that for purposes of simplicity of illustration the lowest whole number multiple of nineteen plus twelve will suffice for an explanation. Therefore, we assume, for the sake of explanation, that there are thirty-one pixels in each line of scan. For purposes of illustration, beginning with the seventh line of scan in FIG. 2 we see that the nineteen partial-dot values shown in the seventh line of the K*L block in FIG. 1 are in timed relationship to the first nineteen pixels of the seventh line of scan. The sequence of the partial-dot values in the seventh line repeats itself for twelve more pixels and this repetition represents the extension parameter. Thus, as the seventh line of partial-dot positions in the K*L block of FIG. 1 continues to reproduce or cycle through the electronics, the eighth line of scan is occurring and the first input pixel of the eighth line of scan is in timed relationship to the partial-dot value following partial-dot number nineteen. This following partial-dot which initiates the partial-dot value sequencing in the eighth line of scan is actually that which initiates the eight line of the K*L block in FIG. 1. Thus, with the input pixels of a scan line set equal to a whole number multiple of the number of partial-dots in a halftone cell approximating a parallelogram plus the extension parameter, a single line of partial dot values can be circularly buffered without the need for electronic shifting of the partial dot sequence. This presents the ultimate in simplicity for halftone screen functions.

The present invention can be practiced for any halftone cell approximating a parallelogram wherein the "x" and "y" partial-dot repetition representation can be made in numbers which are relative primes of one another. That is, the x and y coordinate values which represent the paths of travel in going from the position of one particular partial-dot in a halftone cell to the identically positioned halftone dot in the next adjoining cell are relative primes of one another. A square is one representative example of a parallelogram. Typical examples of square halftone cells wherein the x and y dot coordinates as defined above, are relative primes, and which halftone cells can be represented by a single line of partial-dot values are set forth below. This list is not inclusive of all such examples. These are merely typical examples of one type of halftone cell which approximates a parallelogram in shape and many other halftone cell shapes, of which FIG. 1 is an example, can be so represented and the invention practiced to produce halftone reproductions having such halftone cells. A square halftone dot is a special case of a parallelogram and has only two unique vector values. Therefore, a single "x" and "y" coordinate completely defines the square.

| TYPICAL EXAMPLES OF SQUARE HALFTONE CELLS ANALYZED IN ACCORDANCE WITH THE FOREGOING | | | |
|---|---|---|---|
| Number of Partial Dots | Extension Parameter | Dot X Coordinate | Dot Y Coordinate |
| 5 | 3 | 2 | 1 |
| 10 | 7 | 3 | 1 |
| 13 | 5 | 3 | 2 |
| 17 | 13 | 4 | 1 |
| 25 | 7 | 4 | 3 |
| 26 | 21 | 5 | 1 |
| 29 | 12 | 5 | 2 |
| 34 | 21 | 5 | 3 |
| 41 | 9 | 5 | 4 |
| 37 | 31 | 6 | 1 |
| 61 | 11 | 6 | 5 |
| 50 | 43 | 7 | 1 |
| 53 | 23 | 7 | 2 |
| 58 | 17 | 7 | 3 |
| 65 | 47 | 7 | 4 |
| 74 | 43 | 7 | 5 |
| 85 | 13 | 7 | 6 |
| 65 | 57 | 8 | 1 |
| 73 | 46 | 8 | 3 |
| 89 | 34 | 8 | 5 |
| 113 | 15 | 8 | 7 |
| 82 | 73 | 9 | 1 |
| 85 | 38 | 9 | 2 |
| 97 | 22 | 9 | 4 |
| 106 | 83 | 9 | 7 |
| 130 | 73 | 9 | 7 |
| 145 | 17 | 9 | 8 |

While the sequence of partial-dot positions or values in the single line in FIGS. 1 and 2 are shown out of numerical order, the single line order is determined by the partial-dot positions in the halftone cell which, in the case shown, are in numerical order. Any sequencing can be utilized, as desired. Thus, it is not necessary to list the actual sequencing of the number of partial-dots in the table presented above. Suffice it to say that adequate results can be obtained with any sequencing of the partial-dots.

Referring now to FIGS. 3A through 3D, there is seen a schematic illustration of circuitry employed to provide the overall halftone reproduction system. Beginning at FIG. 3A, there is seen a six bit decoder comprising 4 integrated circuits, chip 9311, each of which is a 4 bit decoder, and a two bit decoder, chip 9321, electrically connected as shown in FIG. 3. The outputs of each of the decoders are notted such that each output is in its "1" or "high" state. The total number of partial dots in the halftone cell is entered in binary format into the lines designated $2^0$-$2^5$. Thus, a decimal value a ywhere from 0 to 63 for a total of 64 decimal values can be inputted into the decoder in binary format. The choice of "64" is taken for purposes of explanation only, and it will be appreciated upon a reading of the present disclosure that any number adequate for the specific embodiment of the present invention desired to be practiced can be provided. Since the 64 outputs of the decoder are normally in the "1" or "high" state, only the output pin corresponding to the decimal value inputted via binary format into the six input lines will be changed to its "low" or "zero" state. This pin in the "zero" state is electrically connected to its correspondingly numbered input on all eight of the variable length shift registers shown in FIGS. 3B and 3C. Thus, each variable length shift register receives the "zero" signal at the same input. This effectively sets the length of the shift register. For example, suppose the decimal 61 were inputted into the decoder in binary format; thereby causing the "zero" signal to appear at input $\overline{61}$ on each of the eight variable shift registers. Since the input into the shift registers is electrically connected to an AND/OR Gate, the "zero" signal cuts off through the AND portion of the gate any section of the shift register subsequent to the section receiving the "zero" signal. In the example under discussion, the section of all eight shift registers designated $LS\overline{62}$ is effectively cut off from the remainder of the shift register. In this manner, the length of the shift register is effectively adjusted to have a number of sections equal to the decimal value inputted into the decoder.

The decimal value to be inputted into the decoder is set equal to the number of partial dots in the halftone cell. Thus, if the single line of partial-dot values illustrated in FIGS. 1 and 2 were to be inputted, the decimal value inputted into the decoder is nineteen. This results in input $LS\overline{18}$ of all eight variable length shift registers to receive the "zero" signal from the output $LS\overline{18}$ of the decoder. This effectively adjusts the length of all eight of the variable length shift registers to nineteen sections.

Figure 3A:
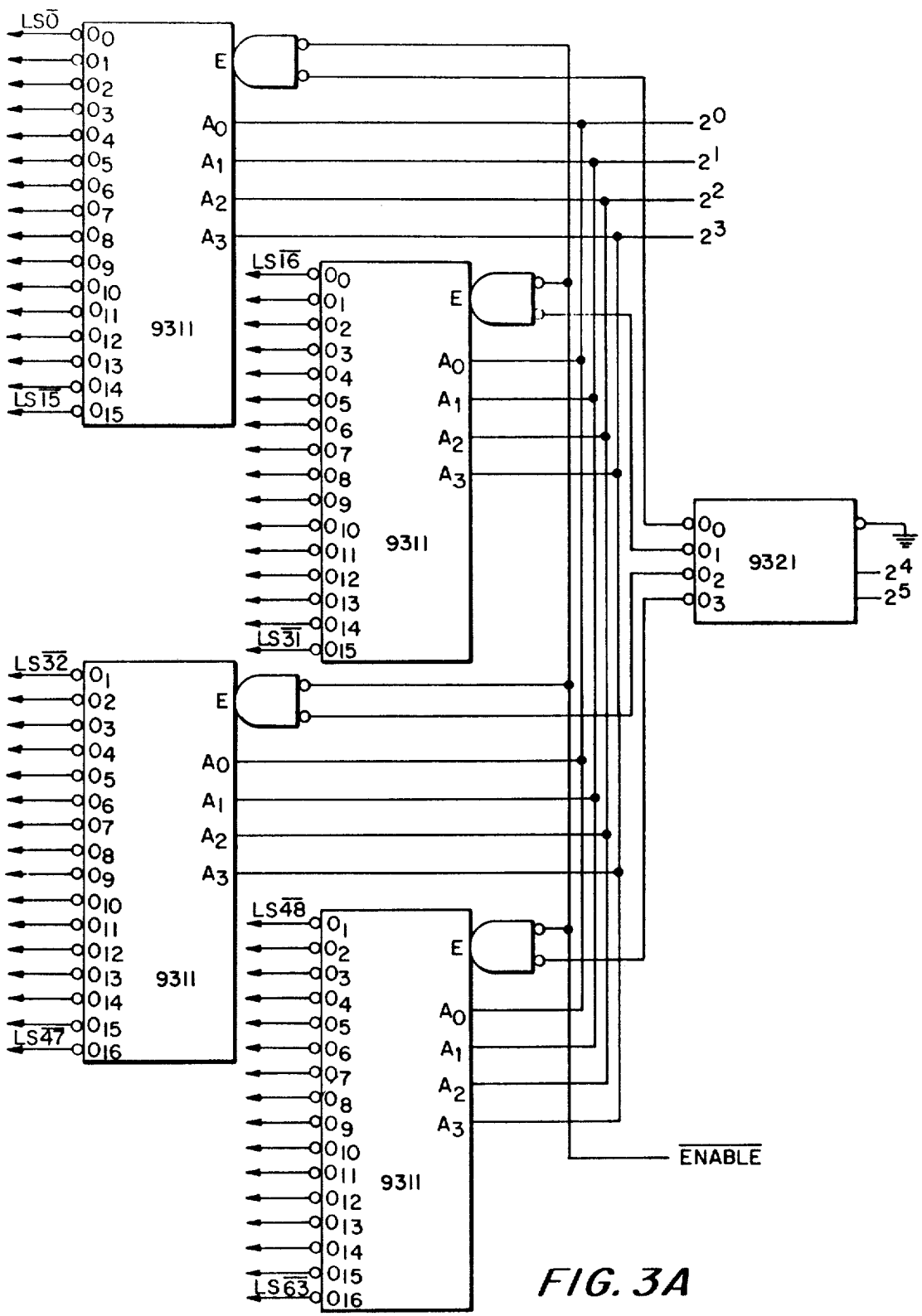
FIG. 3A is a circuit diagram of a six bit decoder having six input lines, $2^0$ through $2^5$, and 64 output lines, LS0 through LS63. Each of the output lines is coupled to a correspondingly labelled terminal in the eight 64 bit variable length shift registers (VLSR) shown in FIGS. 3B and 3C.
Figure 3B:
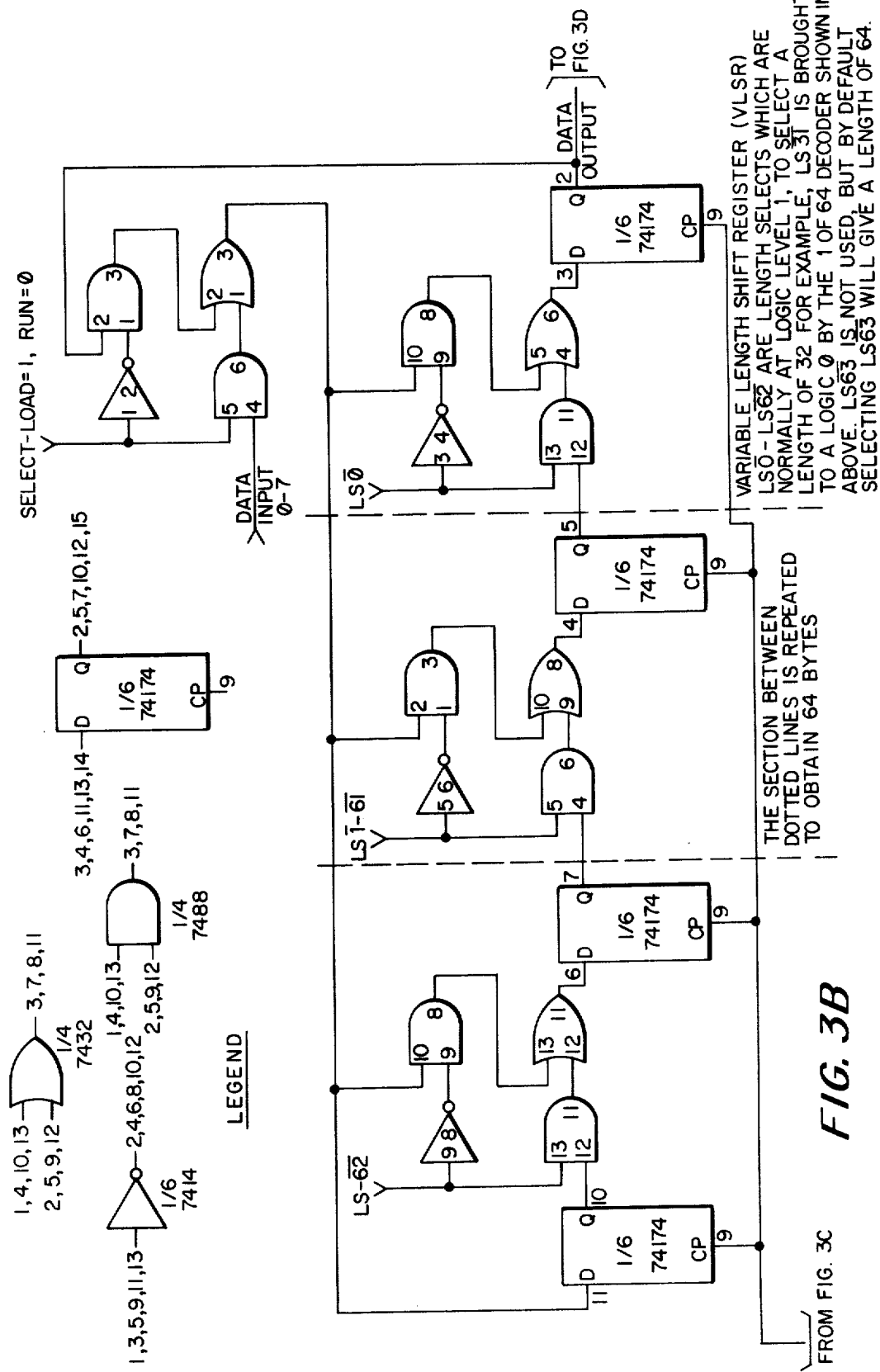
FIG. 3B is a circuit diagram of the first of eight VLSR's coupled in parallel to the outputs of the decoder in FIG. 3A. The loading and shifting logic illustrated in detail in this figure is typical for the remaining seven VLSR's in FIG. 3C.
Figure 3C:
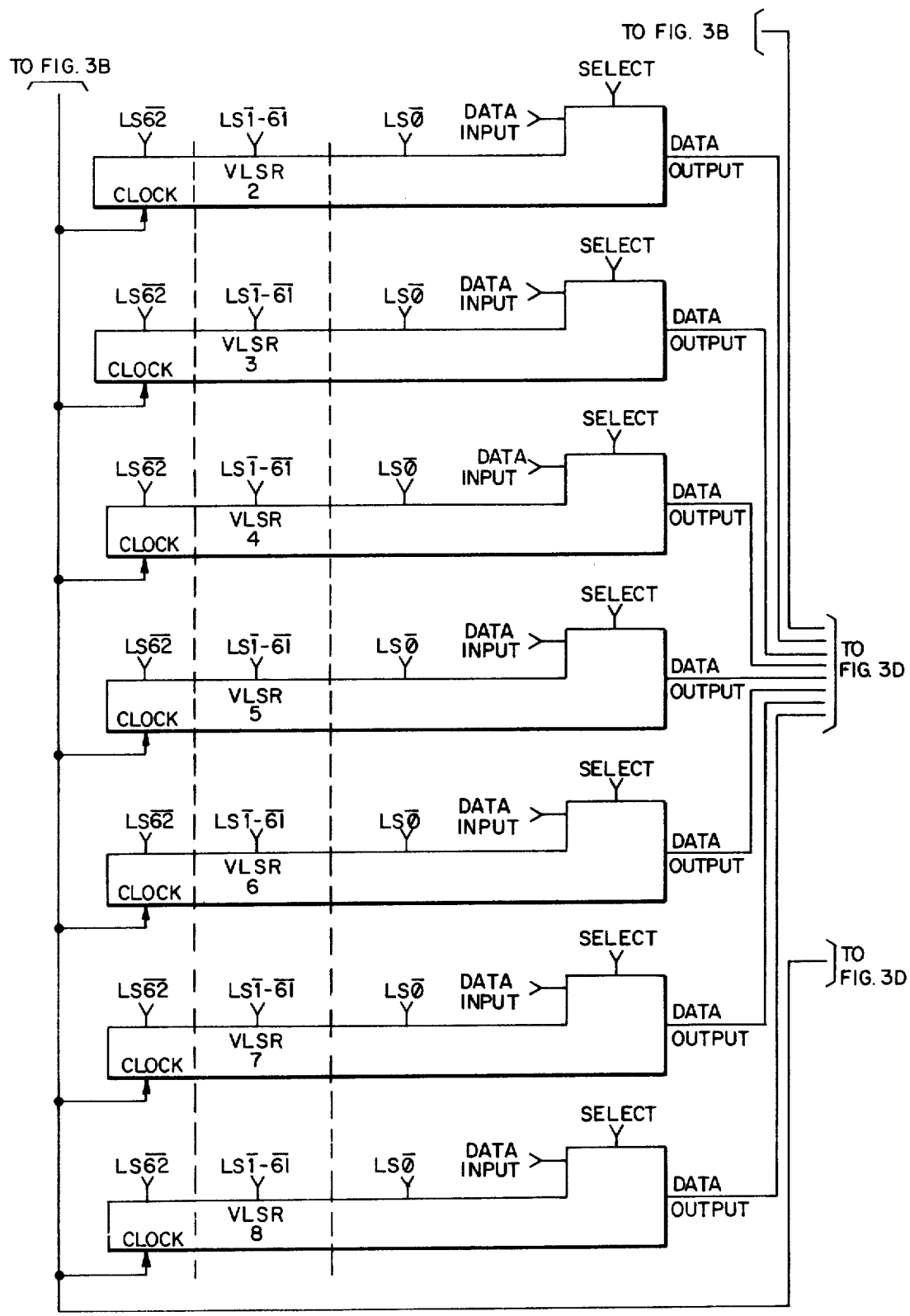
FIG. 3C is a circuit diagram of seven parallel VLSR's of the type illustrated in greater detail in FIG. 3B illustrating the common clock or synchronizing input signals and the parallel data output lines (8 total) that are coupled to the D/A converter of FIG. 3D.

Once the length of the variable length shift register has been set, data is inputted into each of the shift registers at the inputs designated "DATA INPUT" in FIGS. 3B and 3C. The INPUT DATA is loaded as a bit into each of the shift registers so that the eight bits taken together represent a byte which, in turn, represents a partial-dot value such as, for example, those referred to in connection with FIGS. 1 and 2. The bits of each byte are loaded into the corresponding input of corresponding sections of the eight shift registers. On inputting, the INPUT DATA is clocked into the eight shift registers. Each clock pulse loads the appropriate partial-dot value into the gate of the shift register which has been previously selected by a zero on the LS line from the decoder, i.e., the nineteenth gate in the example of FIGS. 1 and 2. In this manner, a single byte corresponding to a partial-dot value is entered into the shift registers. Each clock pulse shifts the previously entered partial-dot values to the right and enters the next partial-dot value. After a number of initial clock pulses, corresponding to each partial-dot in the selected halftone cell, the data has been entered; the SELECT LINE goes "low" or "0"; and halftoning is ready to commence. In the example just mentioned, and illustrated in FIGS. 1 and 2, nineteen bytes are so entered by appropriately entering the data at DATA INPUT and clocking the shift registers. Thus, when the shift registers are loaded with all of the partial-dot values, the least significant bits of all partial-dots are in the top shift register. The most significant ones are in the lowest shift register.

In connection with the variable length shift registers, it is to be noted that for the inputting of data for the circuit of FIG. 3B, the "SELECT LINE" is placed in a "1" or "high" state. Once the data is inputted into the shift registers, they are circularly buffered through the registers upon placing the "SELECT LINE" in its "zero" or "low" state. The actual shifting of the bits comprising the bytes occurs upon receipt of a clocking pulse at the clock input of each shift register. The clocking pulse and the write pulse are of the same frequency and can be taken from a common point in the scanner electronics as discussed below.

Figure 3D:
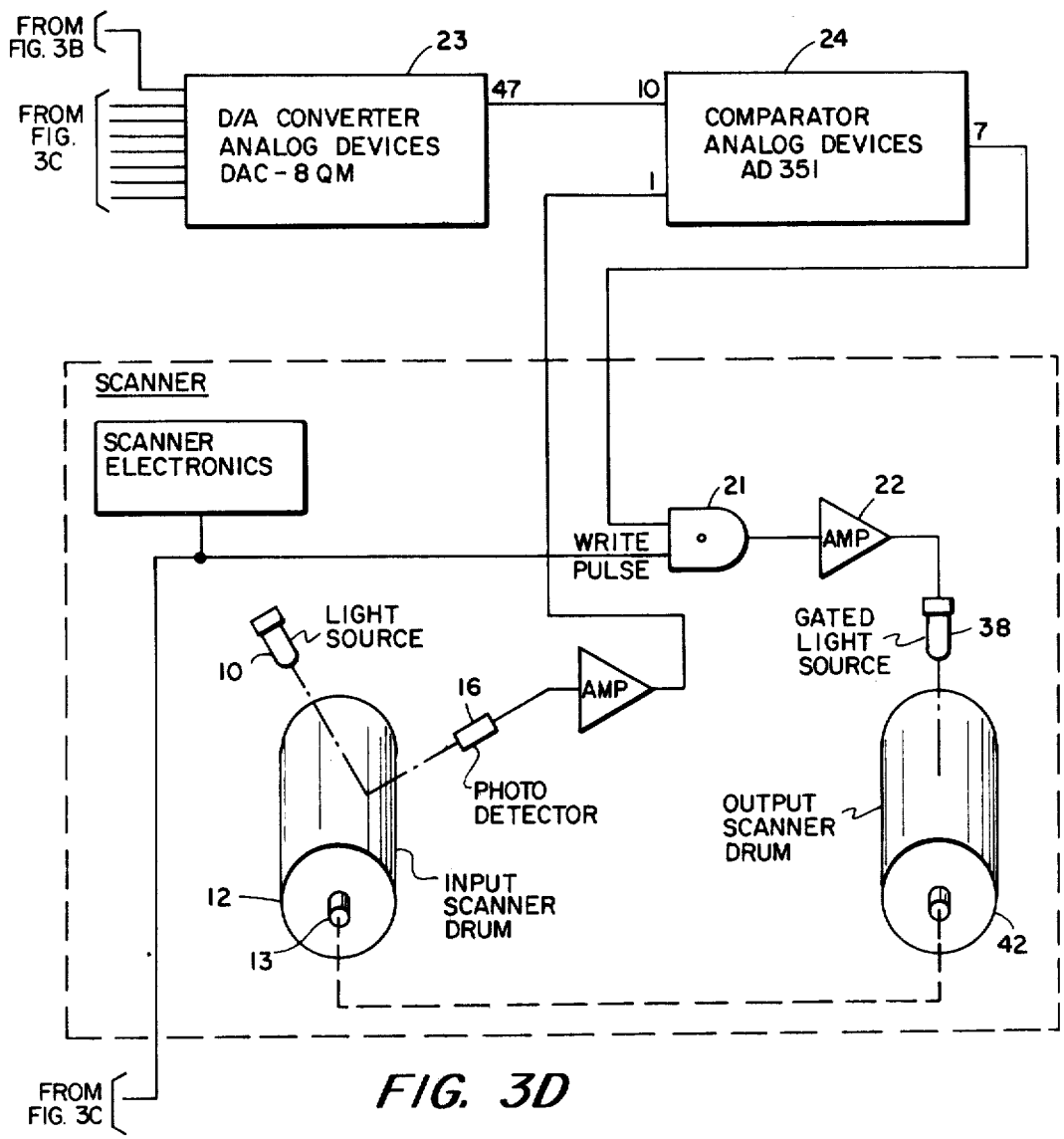
FIG. 3D is a schematic diagram of input and output scanners and associated electronics coupled to receive the output data from the VLSR's of FIGS. 3A and 3C to perform halftone screening according to the present invention.

An 8 bit output bus is connected to the shift registers and is connected to the 8 bit input port of a digital to analog converter shown in FIG. 3D, such as Model DAC-8QM, commercially available from Analog Devices Corporation. Pin 47 of the digital to analog converter 23 is electrically connected to pin 10 of comparator 24. Pin 1 of comparator 24 is utilized as the second input to that device; and, pin 7 of comparator 24 is utilized as the output of that device. The current generated by photodetector 16 and its associated voltage state is amplified by amplifier 20 which is electrically connected to pin 1. The output of comparator 24 taken from pin 7 is electrically connected to one input of AND gate 21 and a write synchronization pulse generated by the scanner electronics comprises the second input into AND gate 21.

The output of AND gate 21 is amplified by amplifier 22 and turns on light emitting diode 38. The light emitted from light emitting diode 38 is focused by lens 44 upon a pixel area of photoreceptor drum 42. The characteristics of comparator 24 are such that there is no output from pin 7 until the signal on pin 1 is equal to or exceeds the signal on pin 10. Thus, the signal on pin 1 which represents the reflection density of the original document on drum 12 must be equal to or greater than the signal on pin 10 which represents the intensity level of the partial-dot position being outputted by the shift registers, before there is an output from pin 7. This occurs at the digitizing rate of the scanners.

Virtually all commercially available scanners have associated electronics built in which provide synchronization signals from synchronizing the reproducing or write scanner with the read scanner. Such a signal from the scanner electronics can be employed to provide both the clocking pulse and the write pulses. In this regard, the clocking pulse electrical connection and the write pulse electrical connection are connected to a common point within the scanner electronics wherever the scanner synchronization signal is found. The clocking pulses and the write pulses are of the same frequency and can be in phase or out of phase with the write pulses lagging the clocking pulses. The write pulses can be in any phased relation to the clocking pulses except for that which would place the write pulses at the digital to analog converter update times. The rate of read and write scans are adjusted to accommodate the circuitry technique.

Figure 4:
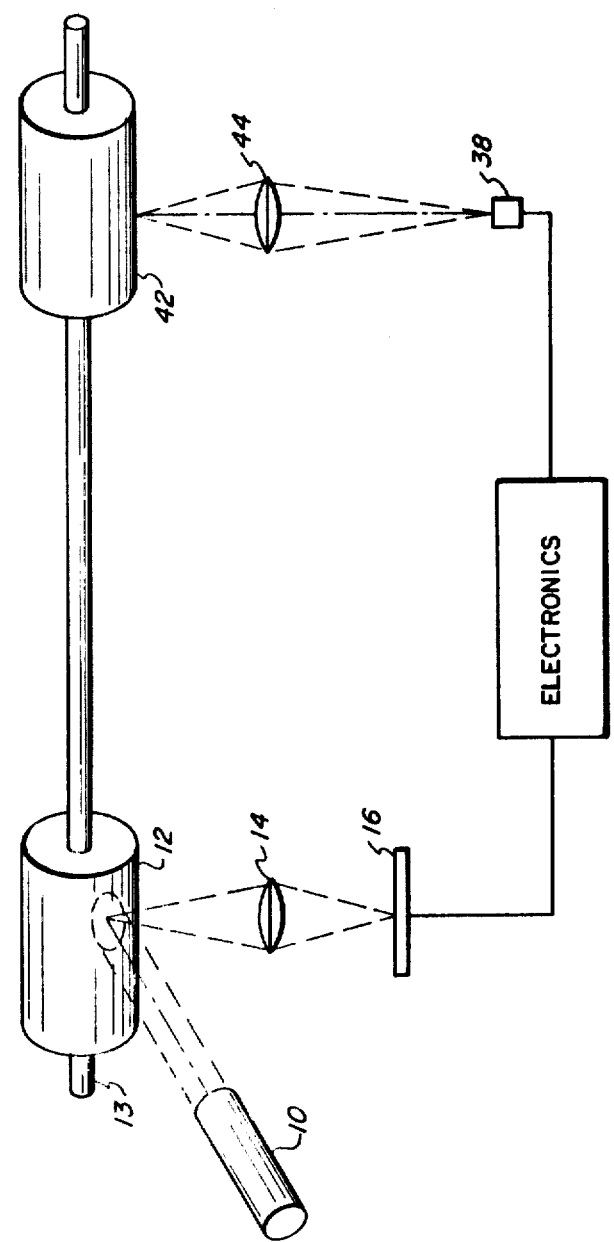
FIG. 4 is a schematic illustration of common-shaft-mounting of the read and write scanning for real time reproduction.

Referring momentarily to FIG. 4, there is seen a schematic block diagram of an electronic halftone image reproduction system according to the invention. A read scanner 10 sequentially illuminates an original image which is attached to the periphery of drum 12 which rotates about shaft 13. The original image may be a transparency as well as an opaque document and the intensity levels obtained by scanner 10 can represent either transmission intensity or reflection intensity, as appropriate. Scanner 10 operates at speeds of a millisecond or less per partial dot time period covered, though the actual speeds will depend upon the characteristics of the particular optical and electronic components used in any embodiment of the invention. Each partial dot time period of the original image, illuminated by scanner 10, is sequentially imaged by imaging lens 14 onto a light sensitive element 16 such as, for example, a photodiode. The various intensities of light striking the light sensitive element 16 are dependent upon the densities of the toner in the original image. The light is transduced by photodiode 16 into analog electronic signals. The analog electronic signal from photodiode 16 is then processed in either analog or digital format, as desired. Intentionally overlooking the electronic circuitry of FIGS. 3A through 3D, which was discussed earlier, the output signal from the electronics is used to control the operation of a write scanner. The write scanner can comprise any scanner suitable for the imaging member to be utilized in forming the halftone reproduction of the original document to be reproduced.

In FIG. 4, the imaging member 42 is a photoreceptor. Thus, a light emitting doide 38 is utilized. The output signal from the electronics will cause the light emitting diode 38 to either turn on or to remain off. If light emitting diode 38 is turned on, then the light emitted therefrom is focused by lens 44 upon photoreceptor 42. The photoreceptor 42 may be any suitable light sensitive recording medium such as a photographic film or a charged xerographic member. In a preferred embodiment, as illustrated, the photoreceptor comprises a charged xerographic drum which rotates about shaft 13 and is matched to the movement of drum 12 which carries the original image. Alternatively, photoreceptor 42 could be moved by another scanner, similar to 10 and matched to it. This sequence occurs for each partial dot time period of the running system.

With the reading scanner adjusted to read the appropriate number of pixels in each of the original scan lines, the automatic indexing of the partial-dot values will occur at the clock pulse rate. This, of course, assumes that the clock rate is less than the time needed to shift one bit through one shift register. Thus, a halftone reproduction is produced in an extremely efficient and straightforward manner. As previously stated, this appropriate number of pixels is equal to the sum of a whole number multiple of the number of partial-dots in the halftone cell plus the extension parameter earlier discussed.

For example, the imaging member technique or system used in producing the halftone reproduction is not limited to photoreceptors, xerography or copiers. Other systems and technologies applicable to displays and printers can be employed which will take, or can be modified to accept binary information.

Furthermore, it will be appreciated that the circuitry of FIGS. 3A through 3D can be appropriately modified so that comparison can be done digitally rather than the analog comparison depicted.

Furthermore, a lesser or greater number of shift registers can be used as appropriate to the number of intensity levels expected in or desired from the original document.

The present invention is not limited to real time read and write scanning; the invention can be practiced by using magnetically recorded original document scan data as the input and recording the electronically halftoned "image" on any storage device for later use in reproduction.

What is claimed is:

1. In an electronic halftone image screening method of the type having an original image to be electronically screened represented by electronic image signals related to the image densities of sample areas of the original image ordered in multiple scan lines and having an electronic halftone screen of a predetermined angle represented by electronic screen signals related to the image density values of partial dots within cells of the screen which correspond to sample areas in the scan lines, the improvement comprising selecting the number of screen signals, NLEV, to be equal to the number of partial dots within a cell of the electronic screen, ordering the screen signals in a sequence determined by the angle of the cells in the screen, selecting the number of image signals in a scan line to equal a whole number integer multiple times NLEV plus a number equal to an extension parameter E, wherein E is a constant value determinable from the angle of the cells in the screen, recycling the ordered sequence of screen signals during a scan line by scan line sequencing of the image signals, synchronizing the occurrence of the first image signal in at least one scan line with the corresponding screen signal in the recycling sequence of screen signals and combining the synchronized image and screen signals to generate screened image signals related to the image densities of sample areas in scan lines of an electronically screened reproduction of the original image.

2. The method of claim 1 further including the steps of applying said screened image signals to writing scanner means to produce a visible image of the screened reproduction of the original image.

3. The method of claim 2 wherein said writing scanner means includes a modulated light source responsive to the screened image signals adapted to produce the screened reproduction of the original image on a photoreceptor member.

4. The method of claim 3 wherein the photoreceptor member includes a charged xerographic member.

5. The method of claim 1 further including the steps of scanning an original document with scanning means to generate said electronic imaging signals.

6. The method of claim 1 wherein said recycling step is performed using a variable length shift register.

7. The method of claim 1 wherein the combining step includes the step of comparing the image and screen signals.

8. The method of claim 1 wherein the combining step includes the steps of adding the image and screen signals and thresholding the sum.

9. The method of claim 1 wherein the combining step includes the steps of multiplying the image and screening signals and thresholding the product.

10. In electronic halftone image screening apparatus of the type having an original image to be electronically screened represented by electronic image signals related to the image densities of sample areas of the original image ordered in multiple scan lines and having an electronic halftone screen of a predetermined angle represented by electronic screen signals related to the image density values of partial dots within cells of the screen which correspond to sample areas in the scan lines, the improvement comprising:

shift register means for storing a number of screen signals, NLEV, equal to the number of partial dots within a cell of the electronic screen and for recycling the screen signals in an ordered sequence during a scan line by scan line sequencing of the image signals, the order of the screen signals being determined by the angle of the cell in the electronic screen, scan line means for selecting the number of image signals in a scan line to equal a whole number integer multiple times NLEV plus a number equal to an extension parameter E, wherein E is a constant value determinable from the angle of the cells in the electronic screen, synchronizing means for synchronizing the occurrence of the first image signal in at least one scan line with the corresponding screen signal in the recycling sequence of screen signals and combining means for combining the synchronized image and screen signals to generate screened image signals related to the image densities of sample areas in scan lines of an electronic reproduction of the original image.

11. The apparatus of claim 10 wherein said combining means includes means for comparing the image and screen signals.

12. The apparatus of claim 10 wherein said combining means includes means for adding the image and screen signals and means for thresholding the sum.

13. The apparatus of claim 10 wherein said combining means includes means for multiplying the image and screen signals and means for thresholding the product.

14. The apparatus of claim 10 wherein said shift register means includes a variable length shift register.

15. The apparatus of claim 10 further including writing scanner means responsive to said screened image signals to produce a visible image of the screened reproduction of the original image.

16. The apparatus of claim 10 further including input scanner means for generating the image signals from an original document.

17. The apparatus of claim 15 wherein said writing scanner means includes a modulated light source responsive to the screened image signals adapted to produce the screened reproduction of the original image on a photoreceptor member.

18. The apparatus of claim 17 wherein the photoreceptor member includes a charged xerographic member.

* * * * *